Figure 1:
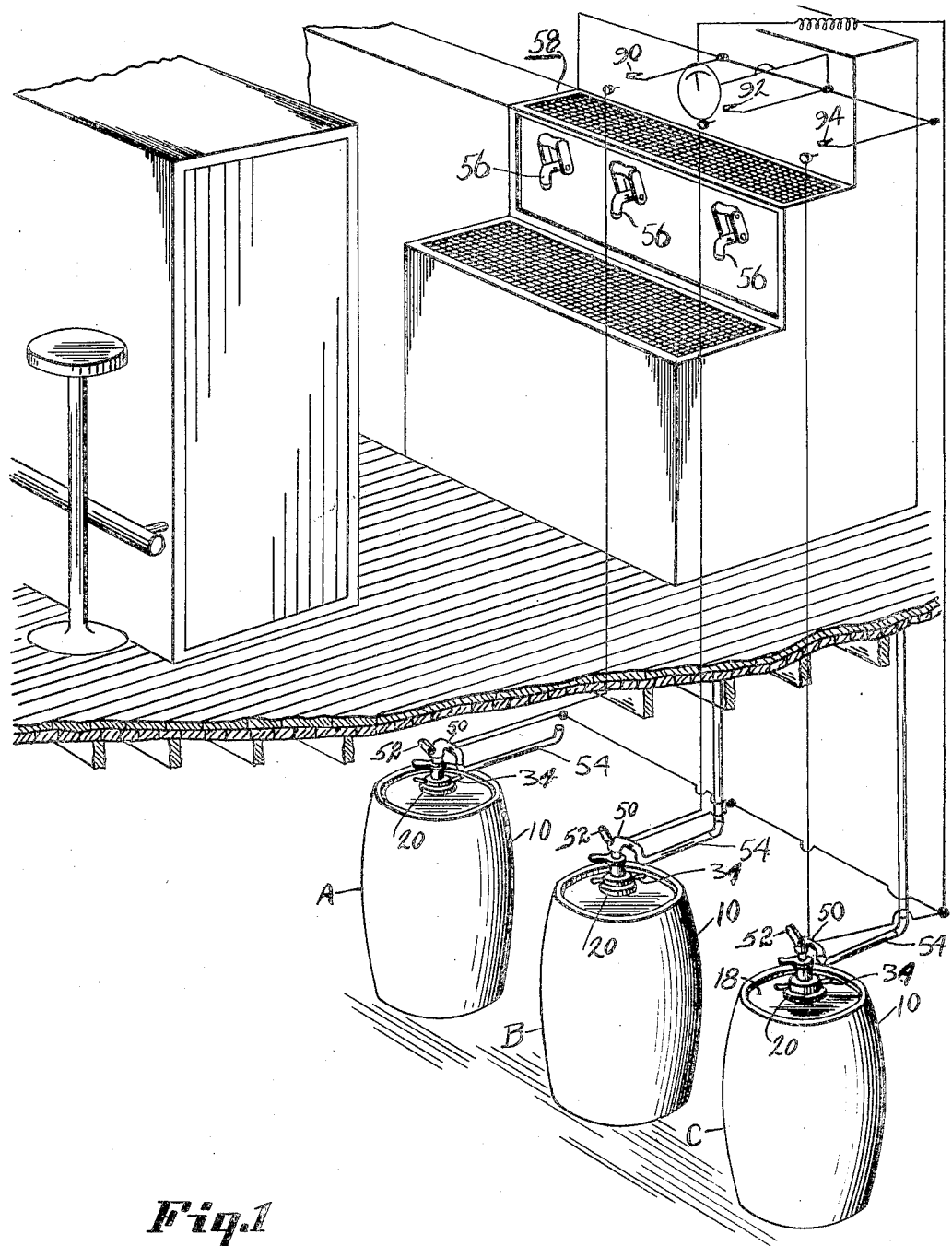

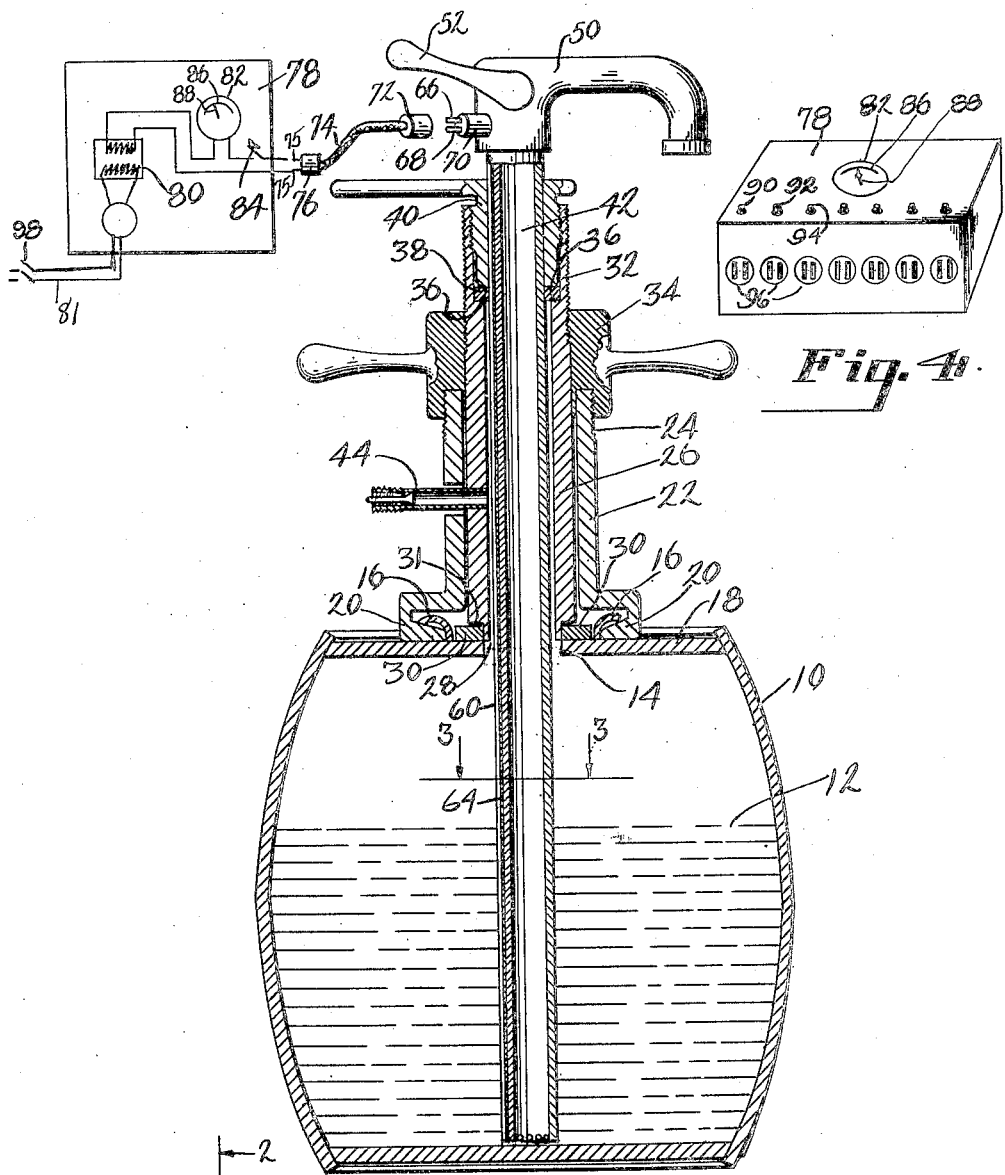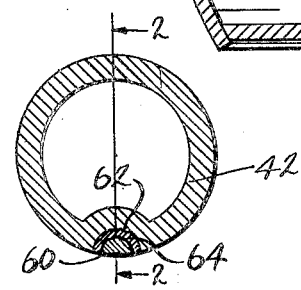

Patented Aug. 23, 1938

2,127,875

UNITED STATES PATENT OFFICE 2,127,875

DISPENSING GAUGE

Leo H. Lippert and Jean F. York, Sioux Falls, S. Dak.

Application April 29, 1936, Serial No. 76,976

1 Claim. (Cl. 201—48)

This invention relates to measuring devices for liquids and in more particular to measuring devices for use in beer dispensaries.

It is common practice to store a supply of beer in barrels or kegs or other suitable vats under pressure so that the beer may be dispensed through suitable taps. Due to the connection of the barrels to the dispensing device and the application of pressure, it is very inconvenient and practically impossible to measure the amount left in the barrel. This is further complicated by the foam that may be on the top. Due to these inconveniences and difficulties, the supply may become exhausted at the most inopportune time.

An object of this invention is to provide an electrical metering device or measuring device that is connected to the beer dispensing apparatus.

Another object of this invention is to provide an electrical measuring device that may be used for measuring any one of a battery of sources of supply of liquid.

Another object of this invention is to provide apparatus for interconnecting the measuring device to any one out of a plurality of sources of supply.

Other objects and advantages reside in the construction of parts, the combinations thereof and the mode of operation, as will become more apparent from the following description.

Fig. 1 discloses a perspective view of the dispensing apparatus and the measuring device therefor, as applied to any one out of a plurality of sources of supply.

Fig. 2 discloses a vertical sectional view of an attachment for a beer keg incorporating the measuring device, the section being taken substantially on the line 2—2 of Fig. 3.

Fig. 3 is a sectional view taken substantially on the line 3—3 of Fig. 2.

Fig. 4 discloses a measuring device having a plurality of outlets which may be used to measure a selected source of supply.

The measuring device may be adapted for use with dispensing apparatus now on the market. That being the case, a conventional type of dispensing apparatus will first be described in detail in order to more fully and better understand the operation of the measuring device.

Referring to the drawings, the reference character 10 indicates a beer barrel or keg containing the beer 12 and provided with a suitable aperture 14 in the top 18 thereof.

A pair of ears 16 fixedly attached to the top or end 18 of the barrel 10 interlocks with a pair of ears 20 integral with a tubular sleeve 22 that is threaded at 24. Mounted within this sleeve 22 is another sleeve 26 provided with a flange 28 at the bottom thereof and having a shoulder 31 abutting the rubber gasket 30, so that as the sleeve 26 is urged downwardly as viewed in Fig. 2, it engages the rubber ring or gasket 30 and when tightened completely seals the juncture between the cover 18 and the sleeve 26.

This sleeve 26 is provided with threads 32 oppositely threaded from the threads 24. The sleeves 22 and 26 move in opposite directions when the coupling member 34 is rotated. Therefore, as the coupling member 34 is rotated in one direction it urges the sleeve 22 upwardly and the sleeve 26 downwardly, and vice versa. By means of this structure the rubber ring or packing gland 30 is compressed by a force exerted upwardly against the ears 16.

In addition to the external shoulder 31, abutting the rubber ring 30, the tubular sleeve 26 is provided with an internal shoulder 36 upon which a rubber ring 38 is seated and clamped in position by a tubular plug 40 threadedly engaging the interior threads of the tubular sleeve 26.

A supply pipe 42 concentrically disposed and passing through the sleeves 22 and 26 provides a suitable outlet for the beer in the barrel which may be placed under pressure by supplying compressed air to the valve 44 fixedly attached to the inner tubular sleeve 26. Sufficient clearance is provided between the exterior of the feed pipe or supply pipe 42 and the tubular sleeve 26 to permit the compressed air supplied through the valve 44 to enter the barrel. The packing gland or rubber ring 38 prevents the escape of the air through the top of the assembly. As the pipe 42 is held in position by the rubber gasket 38, it is insulatingly mounted with respect to the connecting parts for coupling the pipes to the barrel.

A valve 50 provided with a handle 52 is mounted on the upper end of the supply pipe 42 as viewed in Fig. 2. By referring to Fig. 1 the valve 50 may be connected through suitable pipes 54 to the taps 56 mounted in a suitable cabinet shown schematically at 58. Whenever it is desired to draw beer under pressure from the barrel it is merely necessary to open the tap 56, providing the valve 50 has been previously opened.

The cabinet 58 may contain several taps supplied through independent pipes from a battery or series of barrels A, B and C, shown in Fig. 1.

It is a common practice to have the barrels in the basement and the taps 56 together with the dispensing cabinet on an upper floor. In view of the fact that the barrels 10 are connected by pipes 54 to the taps 56 and the beer is normally under pressure, it is very inconvenient to measure the quantity of beer left in the barrel. Therefore, it frequently happens that a certain brand of beer is exhausted at the most inopportune time.

In order to ascertain the quantity of beer remaining in each of the barrels a measuring device has been provided therefor. This measuring device utilizes the electrical resistance of the liquid remaining in a barrel to control the current flow, which current flow is dependent upon the depth or height of the liquid level. In some installations in addition to variations in the resistance to the flow of the current through the liquid, the current may be supplied to the liquid through an electrode, the resistance of which increases as the liquid level within the barrel is lowered.

The source of electrical energy is supplied to the liquid through a pair of electrodes extending from the top of the vessel to the bottom thereof, the electrodes being insulatingly mounted from each other. In the modification disclosed in Figs. 2 and 3, the supply pipe 42 has been utilized as one electrode having embedded in one side thereof another electrode 60. By referring to Fig. 3 the supply pipe 42 has been provided with a longitudinal groove 62, supporting an insulating member 64, in which is mounted the second electrode 60.

At the top of the pipe 42 preferably in the valve 50, the electrodes 42 and 60 are connected to a pair of prongs 66 and 68 projecting outwardly from a plug 70, preferably of insulating material. The prongs 66 and 68 are adapted to receive an electrical socket 72 connected by a cable 74 having a pair of leads not shown, to a plug 76 having a pair of prongs 75 that may be plugged into the side of a box 78. This meter box 78 includes a transformer 80 or any other suitable source of electrical power through a pair of conductors 81. The secondary winding of the transformer 80 has one terminal connected to one electrode and the other terminal connected in series with a meter 82 in series with the other electrode.

In order to conserve on energy, and to interrupt electrolysis, a push button switch 84, normally in open position, is momentarily closed when measuring the contents of the barrel. The meter 82 is preferably provided with a graduated scale 86 and a pointer 88 moving along the scale to indicate the liquid level in the barrel 10. The scale may be graduated so as to register "full" when the liquid level is at the top of the barrel and "empty" when at the bottom of the barrel. Suitable indicia or notations may be made along the scale between the "full" and the "empty" position, such as "½ full", "¼ full" and "¾ full" or the like.

More than one barrel may be connected to the same meter as schematically shown in Figs. 1 and 4. If it is desirable to measure the contents in barrel A the attendant pushes the push button 90, which connects the lead extending from barrel A to the meter, so as to complete the circuit through the electrodes located in barrel A. If it is desirable to measure the contents in barrel B the attendant presses the corresponding push button 92 and likewise when measuring barrel C the attendant momentarily pushes the push button 94. Separate leads may be used from the meter to each of the barrels or a common ground may be used, thereby simplifying and reducing the wiring of the device.

A suitable switch 98 may be used in the input line to the meter to disconnect the entire system from the source of energy.

In Fig. 4 a plurality of outlet sockets 96 have been provided for the meter, so as to permit the use of the meter with one or more barrels. Thus, the measuring device is flexible, there being one outlet socket for each of a plurality of barrels.

For some types of installations, especially those wherein the liquid is withdrawn from or near the bottom of the barrel, the electrodes may also be introduced near the bottom so as to project upwardly. The electrodes may in some installations be mounted on the inside of the vessel and connected to the meter through suitable terminals extending through the vessel. The electrodes may be separate from the outlet pipe.

When a grooved pipe is used the groove may be interrupted to support one or more electrodes.

Although the preferred modifications of the device has been described, it will be understood that within the purview of this invention various changes may be made in the form, details, proportion and arrangement of parts which generally stated, consist in a device capable of carrying out the objects set forth, in the novel parts, combination of parts and mode of operation, as disclosed and defined in the appended claim.

Having thus described our invention, we claim:

In a device arranged to be interposed in an electrical circuit for measuring a quantity of an electrically conducting liquid in a container, the combination of a metallic draft pipe arranged to be immersed in the liquid, and insulatingly mounted in the container, said metallic draft pipe having a longitudinal groove extending from one end to the other, and a longitudinal electrode mounted in said groove and insulated from said draft pipe, said electrode and draft pipe being exposed to the liquid.

LEO H. LIPPERT.
JEAN F. YORK.